US007554249B2

(12) United States Patent
Braun et al.

(10) Patent No.: US 7,554,249 B2
(45) Date of Patent: Jun. 30, 2009

(54) ELECTRIC MOTOR

(75) Inventors: Hans Braun, Leuven (BE); Ning Qu, Reutlingen (DE); Klaus Heyers, Reutlingen (DE); Heinz Eisenschmid, Ditzingen-Horschlanden (DE); Carsten Raudzis, Leinfelden-Echterdingen (DE); Frank Schatz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 655 days.

(21) Appl. No.: 10/541,783

(22) PCT Filed: Apr. 14, 2004

(86) PCT No.: PCT/DE2004/000776

§ 371 (c)(1),
(2), (4) Date: Jul. 11, 2005

(87) PCT Pub. No.: WO2004/093102

PCT Pub. Date: Oct. 28, 2004

(65) Prior Publication Data

US 2006/0138778 A1 Jun. 29, 2006

(30) Foreign Application Priority Data

Apr. 16, 2003 (DE) ................................ 103 17 466

(51) Int. Cl.
*H02K 3/46* (2006.01)

(52) U.S. Cl. ................................ 310/354; 318/400.03

(58) Field of Classification Search ....................... None
See application file for complete search history.

(56) References Cited

U.S. PATENT DOCUMENTS 3,140,531 A 7/1964 Vanik et al.
3,406,366 A 10/1968 Kontrimas et al.
3,758,830 A * 9/1973 Jackson ...................... 257/419
4,047,436 A * 9/1977 Bernard et al. ................ 338/25
4,533,898 A 8/1985 Sauermann
5,886,515 A * 3/1999 Kelly ......................... 323/313
6,144,085 A * 11/2000 Barker ........................ 257/467
6,400,252 B1 * 6/2002 Smith et al. ................. 338/308
6,667,139 B2 12/2003 Fujisawa et al.
2001/0015199 A1 * 8/2001 Yamada et al. .............. 123/494
2002/0033519 A1 * 3/2002 Babcock et al. ............. 257/536
2002/0151148 A1 * 10/2002 Racanelli .................... 438/385

FOREIGN PATENT DOCUMENTS

DE 41 22 252 A1 1/1993
DE 41 38 943 C1 5/1993
GB 748799 5/1956
GB 1002704 8/1965
GB 1025106 4/1966
JP 52-62679 5/1977
JP 59-110182 6/1984
JP 4014863 1/1992
JP 8330514 12/1996
JP 2002071416 A * 3/2002
JP 2002299205 12/2002

* cited by examiner

*Primary Examiner*—T C Patel
*Assistant Examiner*—Renata McCloud
(74) *Attorney, Agent, or Firm*—Michael J. Striker

(57) ABSTRACT

An electric motor, in particular a starter device for internal combustion engines in which a current-limiting electric resistor (57) with a negative temperature coefficient is connected at the beginning of the main current path (49) of an electromagnetically excitable rotor (53) of the electric motor (16). The electric resistor (57) contains at least one monocrystalline semiconductor.

16 Claims, 4 Drawing Sheets

ELECTRIC MOTOR

BACKGROUND OF THE INVENTION

Starters for internal combustion engines are essentially comprised of an electric motor that acts by means of a reduction gear on the crankshaft of the internal combustion engine and, within an interval of for example 0.5 to 1 sec, accelerates it to speeds of typically more than 200 rpm. The output required for this ranges from less than 1 kW for small gasoline engines to greater than 4 kW for large diesel engines. Because of the extremely high currents ranging from several hundred to over 1000 A temporarily required for this, and due to the limited, fixed internal resistance of the battery and the altogether low all-in resistance of the starter circuit, the battery voltage drops from for example 12 V down to 3 V, as a result of which the power supply to most of electronic devices in the vehicle can be interrupted.

Whereas this interaction of the starter with other vehicle components is hardly significant when it occurs once at the beginning of a trip, the consequences of the drop the electrical system voltage with repeated starting in so-called start and stop operation are intolerable and under certain circumstances, can even be safety critical. There are various conceivable strategies for ameliorating these consequences in order to avoid or suppress this drop in the electrical system voltage. For example, these measures include an electrical system with two batteries of the kind known, for example, from DE-OS 41 38 943. Another measure is the regulation of the starting current by means of a so-called MOSFET switch. The complexity of these measures, however, necessarily adds considerable expense to the electrical system or the starter.

In small motor construction and the use of small motors in vehicles, a known method for limiting the starting currents of these small motors is to connect resistors with negative temperature coefficients, so-called NTC resistors, before the electromagnetically active part of the small motor. After the small motor is switched on, the NTC resistor is powerfully heated by the current load and the initially high resistance. Due to the negative temperature coefficient of the resistor, this initially high resistance decreases and simultaneously so does the power loss of the resistor so that even the losses in stationary operation are low. German patent application DE 41 22 252 A1 has disclosed a circuit of this kind with an NTC resistor. In it, a so-called NTC resistor is built into a secondary current path of the starter device. This NTC resistor—which is known in this location—is connected in parallel with the main current path of the electric motor, is simultaneously connected in series with the parallel-connected pull-in and holding coils of the starter relay, and influences the current load during starting.

The commercially available NTC resistors, i.e. resistors with negative temperature coefficients, are based on a ceramic substrate and are comprised of semiconducting ceramic with a comparatively low current-carrying capacity. It would be impractical to use these components in a range of approximately 1000 A since they would then have to be extremely large and would therefore be unstable in certain circumstances. Such NTC resistors would also be geometrically too large for conventional starter devices.

The maximum voltage drop in the electrical system during operation of the starter is determined by the internal resistance of the battery, the ohmic resistance of the armature winding of the starter motor, and the voltage drop at the carbon brushes. This operating condition occurs at the instant in which the starter is in fact being supplied with current, but the rotor of the starter has not yet begun to rotate. This instant is also referred to as the short-circuit point; the short-circuit current is then flowing. With increasing speed, the voltage induced in the windings of the starter reduces the flux and therefore the voltage drop in the electrical system.

The object of the present invention is to limit the current, in particular the short-circuit current, while simultaneously achieving a low or minimal power loss during cranking operation. The current limitation here should be achieved at a minimal expense and should be possible to produce in the form of a component of the starter. This object is attained by means of an electric motor used as a starter, with the combination of characteristics cited in the main claim.

SUMMARY OF THE INVENTION

The electric motor or electric machine according to the present invention, which is used in a particularly advantageous manner as a starting device for an internal combustion engine has the advantage that placing an electric resistor with a suitable, in particular negative, temperature coefficient in the main current path of the electromagnetically excitable rotor of the electric motor of the starter device limits the so-called short-circuit current and therefore also the electrical system voltage drop with a simultaneously minimal power loss during cranking operation. In an advantageous manner, the electrical resistor with the suitable, in particular negative, temperature coefficient is embodied in the form of a monocrystalline semiconductor. It is then possible for the resistor, also referred to as the NTC resistor, to be of an acceptable, small size.

Advantageous modifications of the starter device as recited in the main claim are possible by means of the measures taken in the dependent claims. If a monocrystalline semiconductor comprised of a material with a comparatively high intrinsic charge carrier density and an appropriate energy gap is selected, it is then possible to produce an NTC resistor with a very small volume that has a very low resistance and to simultaneously have the intrinsic charge carrier density and charge carrier mobility be as high as possible in the hot state. NTC resistors comprised of III-V semiconductors, which are composed of InSb and InAs, for example, have turned out to be particularly suitable.

In a particularly advantageous embodiment of the present invention, the NTC resistor is manufactured based on silicon in the monocrystalline state. In addition to the above-mentioned advantages of a reduction in the electrical system voltage drop at the beginning of starter operation, with a simultaneous minimization of the power loss during cranking operation, it is therefore also possible to achieve the functionality in a simple way, based on a conventional silicon technology, thus significantly reducing costs.

In another advantageous embodiment of the invention, the NTC resistor is manufactured based on silicon, with monocrystalline regions and at least one polycrystalline region. Suitable layer construction and doping profiles can be used to adjust the temperature dependence of the resistor so that an abrupt resistance jump can be achieved within a predeterminable temperature range.

Also of particular significance is the design of the thermal coupling of the NTC resistor to the surroundings. The design must assure that the NTC resistor becomes sufficiently hot within the desired timeframe and must simultaneously assure that the ohmic resistance of the contact point is as low as possible.

In a particularly effective placement of the NTC resistor, it is fastened in an integrally joined fashion between two conductors. This assures a large-area contact point between the two conductors and the resistor; the contact resistance is particularly low. In order to protect the resistor and the contact points between the resistor and the conductors from environmental and external influences as much as possible, this assembly composed of the resistor and the two conductors is enclosed in a protective casing. In particular, the protective casing is provided in the form of a cap.

BRIEF DESCRIPTION OF THE DRAWINGS

Exemplary embodiments of the starter devices and associated resistors according to the present invention are depicted in the drawings.

DETAILED DESCRIPTION OF THE PREFERRED EMBODIMENTS

Figure 1:
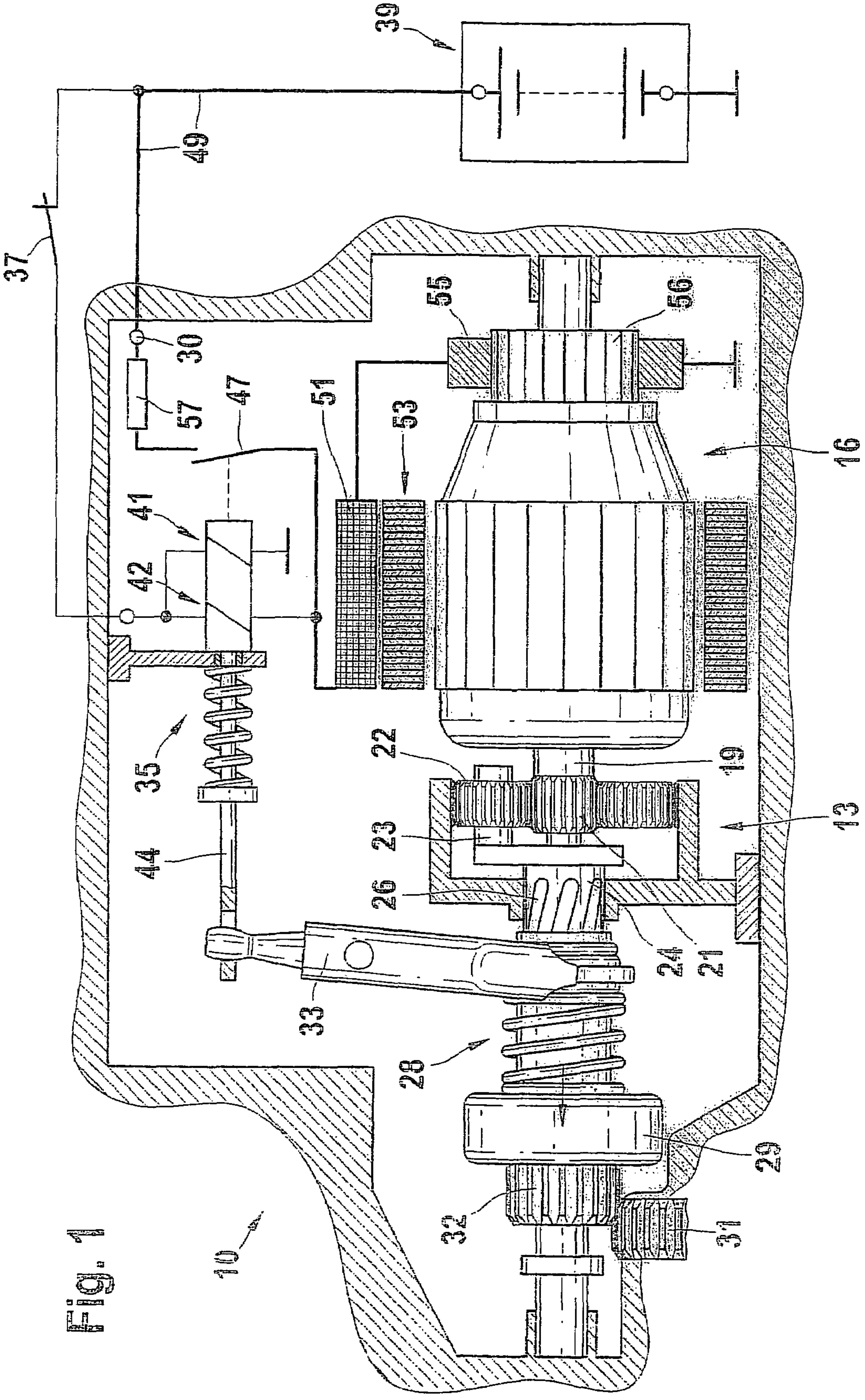
FIG. 1 shows the basic layout of a starter device with an NTC resistor position according to the present invention.

FIG. 1 shows the basic layout of a starter device 10, which in this example is embodied in the form of a so-called screw push starter with an auxiliary transmission. In addition to the above-mentioned auxiliary transmission 13, embodied here in the form of a so-called sun-and-planet gear, the starter device 10 also has an electric motor 16 whose drive shaft 19 drives a sun gear 21 of the auxiliary transmission 13. The drive power of the electric motor 16 is usually transmitted by the sun gear 21 via planet gears 22 to a drive shaft 24 connected to a planet carrier 23. The drive shaft 24 has a so-called steep-pitch thread 26 that is engaged by an internal steep-pitch thread of an engaging drive 28. The engaging drive 28 is also comprised of a freewheel 29 and a drive pinion 32. The drive pinion 32 usually meshes with a gear ring 31 that transmits the drive moment of the starter device to a crankshaft, not shown, of the internal combustion engine.

A lever 33 causes the engaging drive 28 to mesh with the gear ring 31. A starter relay 35 actuates the lever itself; the starter relay 35 also switches the starter motor current. To this end, a starter switch 37 is closed so that at first, a relatively low current flows from a starter battery 39 through a pull-in coil 41 and a holding coil 42 so that a stroke armature, not shown, can be pulled into these two coils. The stroke armature, not shown, is connected to a shifting rod 44. This shifting rod 44 is used to actuate the lever 33. The retraction movement of the stroke magnet also ends up moving a contact bridge 47 so that a main current path 49 can flow from the starter battery 39, via the known terminal 30 and the contact bridge 47, to the electromagnetically excitable parts of the starter motor 16.

In the exemplary embodiment according to FIG. 1, the electromagnetically excitable parts of the electric motor 16 include on the one hand, a pole winding 51 in the stator of the electric motor 16 and on the other hand, a rotor winding, not shown in detail, of the rotor 53, which is supplied with power via brushes 55 and a commutator 56. According to the present invention, a resistor 57 with a negative temperature coefficient is built into the main current path 49. Because of its temperature dependence, this resistor 57 is also referred to as an NTC resistor. It has a negative temperature coefficient, i.e. the resistance level decreases as the temperature increases. According to the present invention, an NTC resistor 57 of this kind is comprised of a monocrystalline semiconductor and, due to its size, is able to conduct the high currents of the electric motor 16 up to a magnitude of between 1000 A and 1500 A. It is therefore suitable for use in the starter device 10.

The specific resistance of the monocrystalline semiconductor material should not only have the desired temperature dependence, but should also be as low as possible so that the semiconductor is able to conduct the required current. For this reason, a monocrystalline semiconductor with the appropriate properties is used. Intrinsic semiconductors the most suitable for this; intrinsic semiconductors are intrinsically conducting semiconductors that do not conduct at a temperature of T=0 K, but do conduct at final temperatures due to the thermal excitation. At final temperatures, a thermal excitation of electrons occurs across band gaps and some electrons travel into the conducting band. The consequently missing electrons leave positively charged gaps in the valence band, so-called holes. Both the electrons and the holes can conduct a current when an electric field is applied.

In order to achieve the desired temperature-dependent conductivity and the desired temperature-dependent resistance behavior, an intrinsic semiconductor can be used, which has a high intrinsic charge carrier density, a particular charged carrier mobility, and an appropriately small energy gap. The term energy gap signifies the energy difference between the conducting band and the valence band. Typical values for such an appropriate energy gap range from 0.2 to 0.6 electron volts (eV).

In order to be able to achieve an NTC resistor, which is of the smallest possible volume and simultaneously has a low resistance at higher temperatures, the intrinsic charge carrier density and the charge carrier density must be as high as possible in the hot or warm state. The charge carrier mobility should also be as high as possible. Typical values for an appropriate energy gap range from 0.2 to 0.6 electron volts (eV); typical values for the intrinsic charge carrier density range from $10^{15}$ to $10^{16}$ $cm^{-3}$; and typical values for the charge carrier mobility range from $3\times10^4$ to $7\times10^4$ $cm^2/Vs$.

Suitable materials for the NTC resistor 57 have chiefly turned out to be III-V semiconductors, which are composed, for example, of the elements indium and antimony (InSb) or indium and arsenic (InAs). In general, germanium (Ge) would also be suitable as a semiconductor material. As will be described in greater detail in conjunction with the exemplary embodiments according to FIGS. 6 through 9, silicon can also used as a semiconductor, but it is then also necessary to fulfill special conditions.

The starter relay 35 and the NTC resistor 57—which is composed of the above-mentioned semiconductors, has the special temperature dependence, and is made using the contacting and connecting techniques mentioned—is designed so that the resistance of the main current path 59 is 10 milliohms (mOhm) in the first 10 milliseconds of the supply of power to the starter and then falls to values below 0.5 mOhm. In this way, on the one hand, the voltage drop in the electrical system voltage can be limited to approximately 9 V in a 12 V starter battery 39 and on the other hand, the power loss is limited to significantly less than 10%. Such a current curve or electrical system voltage curve after the switching on of the starter is produced because immediately after the application of voltage to the starter, at the beginning of the current flow, the semiconductor resistor is still cold and therefore has a low conductivity and a high specific resistance. The subsequent flow of current heats the intrinsic semiconductor resistor, thereby increasing its conductivity and reducing its resistance, as a result of which the all-in resistance of the starter main current path also decreases.

Figure 2:
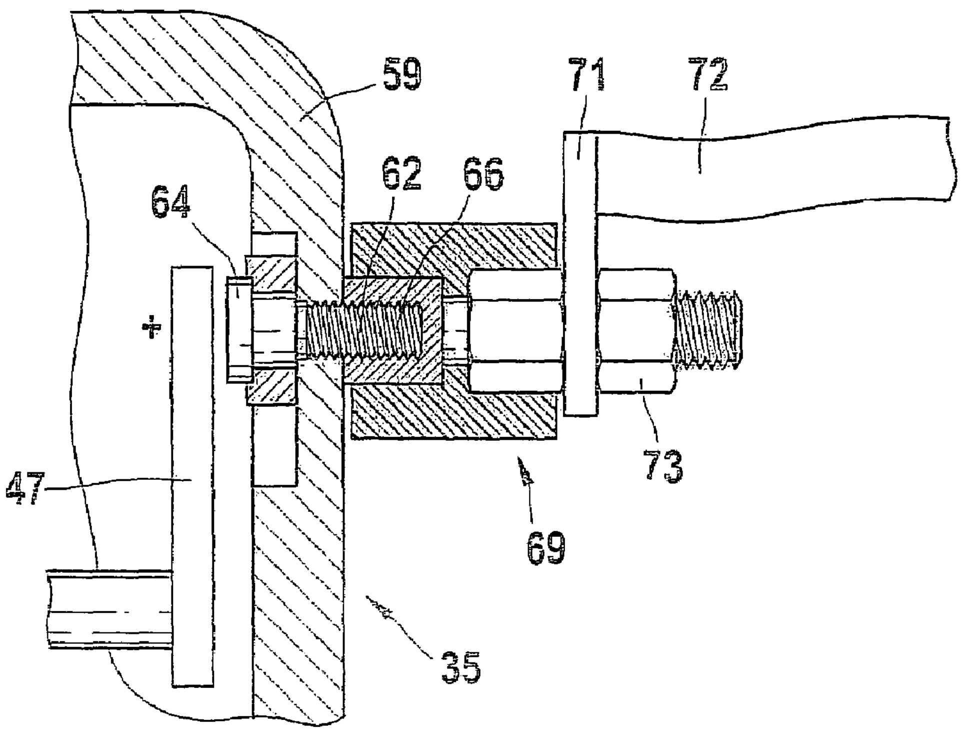
FIG. 2 is a partial, sectional view of a relay housing.

FIG. 2 is a detail view of a starter relay 35 that shows the connection parts on the plus terminal side. Inside the starter relay 35, the contact bridge 47 is shown. Among other things, the starter relay 35 has a cover 59 that covers over the contact bridge 47. A bolt 62 is provided, which extends through the cover 59 and has a contact surface 64 at its end inside the cover 59 and/or starter relay 35. This contact surface 64 is similar to a screw head. The bolt 62 has an external thread 66, to which, in this exemplary embodiment, an NTC resistor assembly 69 is fastened. This NTC resistor assembly 69 will be discussed in greater detail in the course of the discussion of FIG. 3. The plus side of the NTC resistor assembly 69 is attached to a pole shoe 71 whose plus end is electrically connected to the starter battery 39 by means of a connecting cable 72. In this case, the pole shoe 71 is attached by means of a nut 73.

Figure 3:
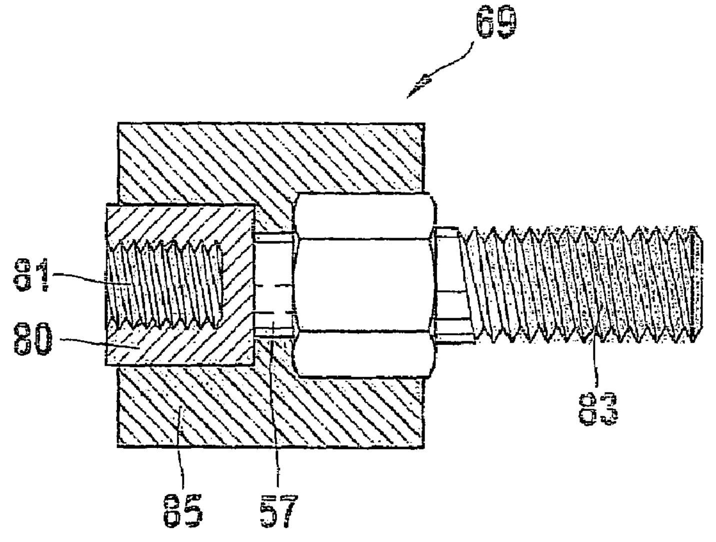
FIG. 3 is a sectional view of an NTC bolt.

FIG. 3 shows the NTC resistor assembly 69. Firstly, this resistor assembly 69 is comprised of a threaded bolt 80, which can be made of steel, for example. This threaded bolt 80 has an internal thread 81 by means of which this resistor assembly 69 can be fastened to the bolt 62 of the starter relay 35. This threaded bolt 80 is fastened in an integrally joined fashion to the temperature-dependent monocrystalline semiconductor resistor (NTC resistor) 57 embodied according to the present invention. Another end of the NTC resistor 57 is fastened to another threaded bolt 83, in a likewise integrally joined fashion. The NTC resistor 57 is thus integrally fastened between two conductors constituted in this case by the threaded bolt 80 and the threaded bolt 83. The threaded bolt 83 here is embodied in a practical fashion in the form of a hex screw so that the above-mentioned pole shoe 71 can be attached to the threaded bolt 83 by means of the nut 73, see FIG. 2. The assembly comprised of the resistor 57 and the two conductors is enclosed by a protective casing, for example constituted by an injection molded plastic casing 85.

Figure 4:
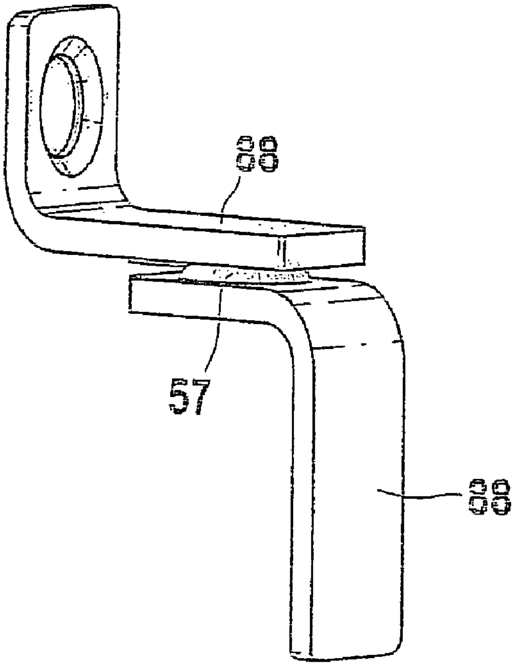
FIG. 4 shows a second exemplary embodiment of the attachment of an NTC resistor to conductors.

FIG. 4 shows a second exemplary embodiment of an assembly comprised of the resistor 57 and two conductors. The resistor 57 here is positioned between two angled conductor rails, but is once again joined to these two rails 88 by means of an integrally joining fastening process. To this end, the resistor 57 is attached to a leg surface of each respective conductor rail. In this case, this assembly depicted in FIG. 4 is provided not in the form of a terminal 30 connection, but serves instead as an intrinsically known, so-called 45 terminal connection between the starter relay 35 and the electric motor 16. The designations terminal 30 connection and terminal 45 connection are standard terminal designations in vehicle electrical systems.

Figure 5:
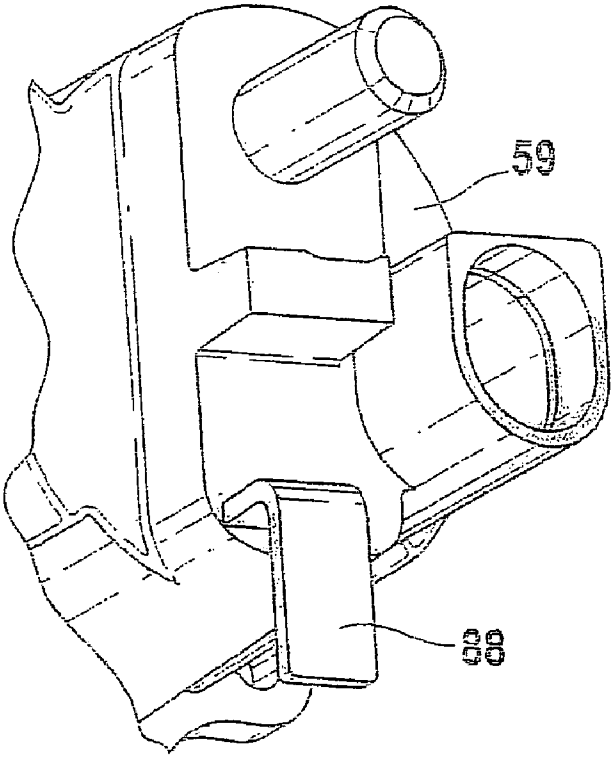
FIG. 5 is a perspective view of a switch cover with an integrated NTC resistor.

FIG. 5 shows the corresponding arrangement of the assembly comprised of the two conductor rails 88 and the resistor 57. This assembly is integrated into the starter relay 35 so that it is largely encapsulated by the cover material of the cover 59 and consequently, only one of the two conductor rails 88 protrudes from the switch cover 59. This protruding conductor rail 88 can then be fastened, e.g. by means of welding, to a conductor that supplies electric energy to the electric motor 16.

Figure 6:
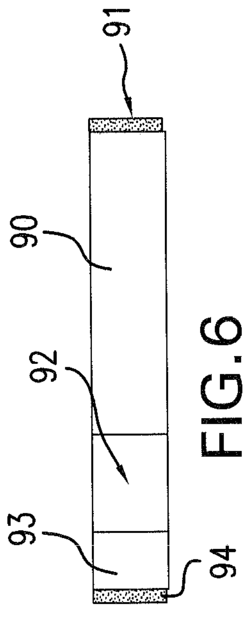
FIG. 6 shows an example for the layer structure of a resistor according to the present invention and/or of a current-limiting component comprised of monocrystalline silicon.

FIG. 6 shows an exemplary embodiment of the present invention in which the current-limiting component and/or the NTC resistor contains a monocrystalline silicon semiconductor. The layer structure of this resistor can be described as follows: a chip 90 made of high-doped substrate material such as monocrystalline silicon with an n doping of 1e20 cm−3 (As or Ab), which is used for low ohmic contacting and for mechanical fastening of the chip, is provided with a metallization 91 on one side, which permits a reliable electrical connection of the chip. The epitaxial layer 92 is deposited onto the high-doped silicon chip 90 and a high-doped contact layer 93 comprised of monocrystalline silicon is deposited onto this epitaxial layer 92 for ohmic contacting purposes. A metallization 94 enables a favorable electrical contact. The metallizations have the highest possible dopings of arsenic or antimony, for example 1e19 cm−3 (As or Sb) and are, for example, 0.2 to 0.5 μm thick.

Figure 7:
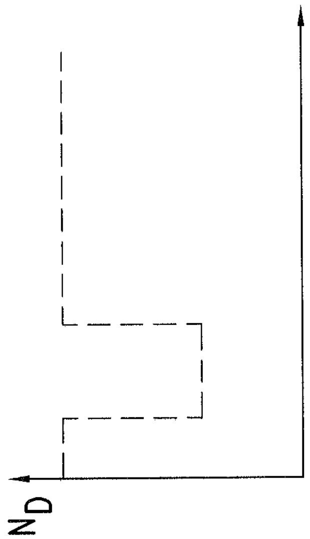
FIG. 7 shows a doping profile for a component according to FIG. 6.

The temperature dependence, which in this component corresponds to a thermal switching function, is attained by means of the lowest possible doped epitaxial layer 92. Typical parameters for the very low-doped epitaxial layer 92 are thicknesses between 2 and 10 μm and dopant concentrations of 1e14 cm−3 to 1e15 cm−3. FIG. 7 shows a possible doping curve.

Figure 8:
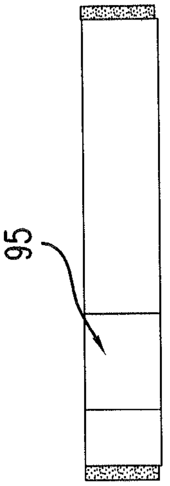
FIG. 8 shows an example for the layer structure of a resistor according to the present invention and/or of a current-limiting component comprised of monocrystalline silicon with a region of polycrystalline silicon.

FIG. 8 shows an exemplary embodiment of the present invention in which the current-limiting component and/or the NTC resistor, instead of having the very low-doped epitaxial layer 92 according to FIG. 6, has a region 95 with a very low-doped polycrystalline silicon. The remaining components correspond to those according to FIG. 6.

Figure 9:
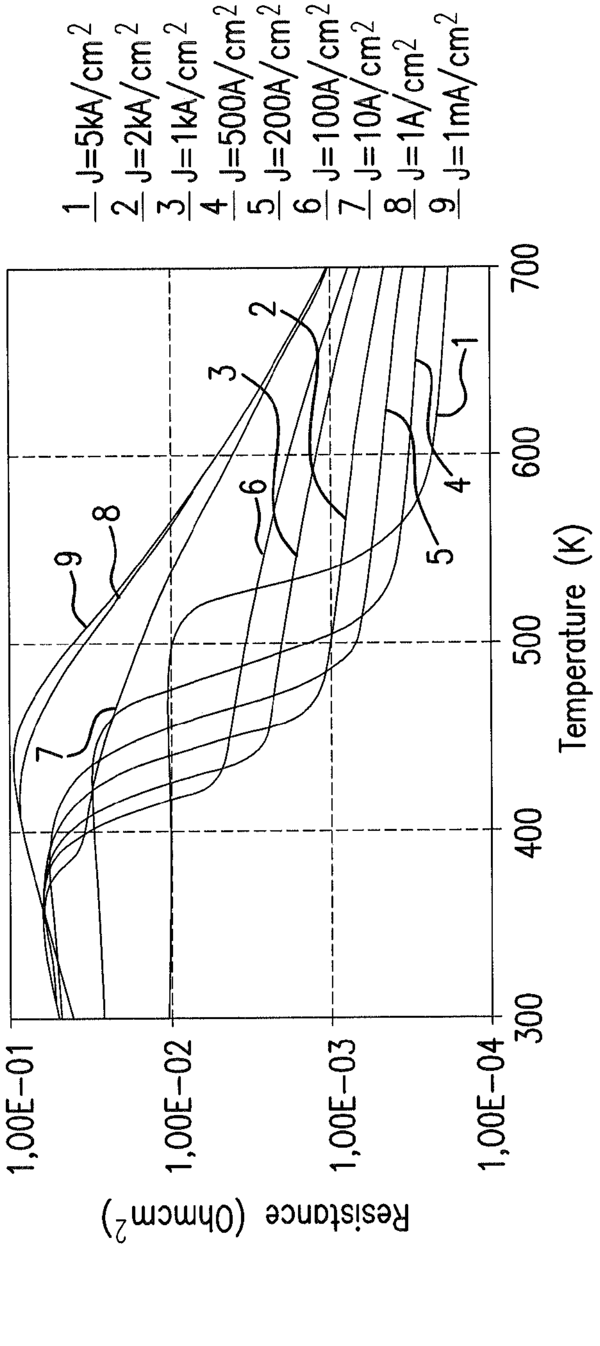
FIG. 9 shows an example of the temperature-dependent curve of the resistance of a current-limiting component according to the present invention for various current densities.

The above-described layer construction and the taking into account of the above-indicated parameters can be used to set the temperature dependency of the resistor of the current-limiting component according to FIG. 6 and in particular according to FIG. 8, to within certain limits as a function of the current density to be conducted. FIG. 9 shows the interrelationships between the resistance (in ohms per square centimeter), temperature (in Kelvin), and current density (in amperes per square centimeter), assuming the presence of ideal ohmic contacts for both connections or electrodes. It is clear that in particular temperature ranges, a particularly large switch throw of 2 decades, caused by the low activation energy of the charge carrier generation, can be achieved, i.e. with a temperature change of less than 50 degrees, the resistance changes by a factor of 100.

Parameter selection and optimization can be used to set the resistance jump so that it lies within a particular range. For example, an abrupt resistance jump of over two decades can be achieved at a temperature of approximately 200° C. Consequently, the current-limiting component can limit the current at lower temperatures and when a higher temperature is exceeded, can limit the current a hundredfold less, thus permitting an ideal use of such a current-limiting component for starter current limitation in starters.

If certain parameters are respected, the depositing of polycrystalline silicon onto a monocrystalline silicon chip is less expensive than the epitaxial growth of silicon. However, due to its low charge carrier mobility, polycrystalline silicon has a somewhat elevated electric resistance, which can be optionally compensated for by greater layer thicknesses. The functioning of the component and the achievement of the above-described temperature dependency of the resistor are based on the thermal modulation of the charge carrier density. Furthermore, in the case of powerful charge carrier injections, the strongly temperature-dependent charge carrier lifetime yields a sharp increase in electron density in the low-doped region and therefore to a sharp, temperature-induced drop in the electrical resistance.

The invention has been described in connection with the use in an electric motor, for example for a starter in a vehicle. Generally, however, the embodiments of the electrical semiconductor resistors can be used independently of such a use to achieve a predeterminable temperature dependency of a resistor.

What is claimed is:

1. An electric motor, in particular a starter device for internal combustion engines in which an electric resistor (57) with a negative temperature coefficient is connected at the beginning of the main current path (49) of an electromagnetically excitable rotor (53) of the electric motor (16), wherein the electric resistor (57) contains at least one monocrystalline semiconductor, wherein the monocrystalline semiconductor (90, 93) is comprised of high-doped silicon and at least one region (92) with low doping that is monocrystalline and is produced by means of epitaxy.

2. The electric motor as recited in claim 1, wherein a doping profile is produced in which a high doping in a region (90, 93) is approximately 1e20 cm−3 and the at least one region (92) with the low doping has a doping between 1e14 cm−3 and 1e15 cm−3.

3. The electric motor as recited in claim 1, wherein a doping profile is produced so that within a predeterminable temperature range, when there is a slight temperature change, the electric resistance of a component changes by large amounts by a factor of up to 100.

4. The electric motor as recited in claim 1, wherein the monocrystalline semiconductor (90, 93) is comprised of high-doped silicon and at least one region (95) with polycrystalline silicon.

5. The electric motor as recited in claim 4, wherein parameters of the region with polycrystalline silicon are selected so that within a predeterminable temperature range, when there is a slight temperature change, the electric resistance of a component changes by large amounts by a factor of up to 100.

6. The electric motor as recited in claim 5, wherein the predeterminable temperature range with a resistance jump lies at approximately 200° C.

7. The electric motor as recited in claim 1, wherein the monocrystalline semiconductor is comprised of a material with a high intrinsic charge carrier density and a predeterminable, low energy gap.

8. The electric motor as recited in claim 7, wherein the monocrystalline semiconductor is a germanium semiconductor.

9. The electric motor as recited in claim 7, wherein the monocrystalline semiconductor is a composite semiconductor in the form of a III-V semiconductor.

10. The electric motor as recited in claim 1, wherein the resistor (57) has a metallization (91, 94) on two sides.

11. The electric motor as recited in claim 1, wherein the resistor (57) is fastened in an integrally joined fashion between two conductors (80, 83, 88).

12. The electric motor as recited in claim 11, wherein an assembly comprised of the resistor (57) and the two conductors (80, 83, 88) is enclosed by a protective casing (85).

13. The electric motor as recited in claim 12, wherein the casing (85) is a cover (59).

14. A temperature-dependent resistor as recited in claim 1, wherein it is used to produce a predeterminable temperature dependency.

15. The electric motor as recited in claim 3, the predeterminable temperature range is 150-250° C.

16. The electric motor as recited in claim 9, wherein the monocrystalline semiconductor is an InSb or InAs semiconductor.

* * * * *